(12) United States Patent
Chen Wang

(10) Patent No.: US 9,023,539 B2
(45) Date of Patent: May 5, 2015

(54) RETAINING MEMBER AND METAL-AIR CELL UNIT UTILIZING THE SAME

(75) Inventor: Kuei-Yung Chen Wang, Taipei (TW)

(73) Assignee: High Tech Battery Incorporated, Taipei (TW)

( * ) Notice: Subject to any disclaimer, the term of this patent is extended or adjusted under 35 U.S.C. 154(b) by 241 days.

(21) Appl. No.: 13/620,792

(22) Filed: Sep. 15, 2012

(65) Prior Publication Data

US 2013/0078538 A1    Mar. 28, 2013

(30) Foreign Application Priority Data

Sep. 23, 2011 (TW) .............................. 100134415 A

(51) Int. Cl.
| | |
|---|---|
| H01M 8/22 | (2006.01) |
| H01M 4/06 | (2006.01) |
| H01M 4/38 | (2006.01) |
| H01M 4/70 | (2006.01) |
| H01M 12/06 | (2006.01) |
| H01M 8/04 | (2006.01) |
| H01M 2/12 | (2006.01) |

(52) U.S. Cl.
CPC . *H01M 4/06* (2013.01); *H01M 2/12* (2013.01); *H01M 4/38* (2013.01); *H01M 4/70* (2013.01); *H01M 12/06* (2013.01); *H01M 8/04089* (2013.01); *Y02E 60/50* (2013.01)

(58) Field of Classification Search
USPC .................................................. 429/400–404
See application file for complete search history.

(56) References Cited

U.S. PATENT DOCUMENTS

| | | | | |
|---|---|---|---|---|
| 5,563,004 | A  * | 10/1996 | Buzzelli et al. ............... | 429/405 |
| 6,332,899 | B1 * | 12/2001 | Pong ............................. | 29/623.5 |
| 6,461,765 | B1  | 10/2002 | Witzigreuter | |
| 2004/0048133 | A1 * | 3/2004 | Faris et al. ...................... | 429/34 |
| 2007/0128495 | A1  | 6/2007 | Bobowick | |
| 2010/0173206 | A1 * | 7/2010 | Wang Chen .................. | 429/400 |

* cited by examiner

*Primary Examiner* — Ula C Ruddock
*Assistant Examiner* — Lisa S Park Gehrke
(74) *Attorney, Agent, or Firm* — Li & Cai Intellectual Property (USA) Office

(57) ABSTRACT

The instant disclosure relates to a retaining member of a metal-air cell unit. The retaining member comprises a plurality of side plates constructed to define an anode compartment; and an air-distributing structure formed in the anode compartment. The air-distributing structure has a height difference from the side plates, and the height difference defines an air-distributing path.

24 Claims, 14 Drawing Sheets

RETAINING MEMBER AND METAL-AIR CELL UNIT UTILIZING THE SAME

BACKGROUND OF THE INVENTION

1. Field of the Invention

The present invention relates to a retaining member. In particular, the present invention relates to a retaining member adapted in a metal-air cell and a cell unit utilizing the same.

2. Description of Related Art

A metal-air cell, such as a zinc-air cell includes a zinc anode, an air cathode and a separator. The anode contains materials to be oxidized while the cathode contains material to be reduced during the electrochemical reaction so as to generate electrical power. The $OH^-$ ion is transferred from the air cathode to the zinc anode through the alkali electrolyte, such as potassium hydroxide (KOH) solution.

The anode of the metal-air cell typically comprises a slurry-like material that contains metal powders, binder, and electrolyte. The metal powder can be zinc powder, magnesium powder, aluminum powder or the alloy powder thereof. When the metal powder reacts with the alkali electrolyte, gas (i.e., hydrogen) is often generated as byproduct of an accompanying side reaction. However, the above-mentioned reaction is undesirable due to its consumption of metal powder to form the oxidation thereof. As a result of the undesired consumption of metal powder, the discharge capacity of the cell is reduced. Furthermore, the production of the hydrogen gas increases the internal pressure of the cell. The increased pressure of the generated gas inside the cell is one of the major causes for electrolyte leakage. In other words, due to the increased pressure of the generated gas, the electrolyte will be leaked through the assembly gap on the casing (i.e., battery cartridge) or gaps formed in connector interfaces. As a result, the reliability of the cells may fall short in meeting the specified application requirements.

In conventional metal-air cell structures, the air cathode is a porous plate structure having through holes thereon so that the gas may pass the air cathode smoothly. In other words, the gas inside the cell may be exhausted from the porous air cathode through the separator. However, after the discharge or preservation, the formed metal oxide, such as the zinc oxide is deposited on the separator to block the exhaustion path of the gas. Thus, the generated gas inside the cell may not be exhausted smoothly due to the blocked separator and the pressure of the generated gas inside the cell is more increased. As discussion above, the increased pressure of the generated gas results in the problem of the electrolyte leakage.

One conventional solution to this problem is to provide venting holes on the battery cartridge for releasing the gas. However, in practice, the venting holes of the traditional cartridge structure are often blocked by the aqueous anode metal slurry due to vibration of the battery or unexpected storage orientation. In addition, the anode expansion/deformation as a result of the chemical reaction during battery discharge may also cause the blockage of the venting holes. As a result, the generated gas cannot be smoothly released and gathers inside the cartridge, thus still causing undesired electrolyte leakage.

SUMMARY OF THE INVENTION

One object of the instant disclosure is providing a retaining member of a metal-air cell unit and the metal-air cell unit having the same. The retaining member of the instant disclosure has an air-distributing path defined by a structural height difference. Therefore, the generated gas can be smoothly exhausted from the separator through the air-distributing path. That means the pressure of the cell unit may not highly increase and the issue of the electrolyte leakage can be reduced.

The instant disclosure provides a retaining member of a metal-air cell unit. The retaining member comprises a plurality of side plates constructed to define an anode compartment; and an air-distributing structure formed in the anode compartment. The air-distributing structure has a height difference from the side plates, and the height difference defines an air-distributing path.

The instant disclosure provides a metal-air cell unit. The metal-air cell unit includes a retaining member, a metal slurry anode, an air electrode and a separator. The retaining member comprises a plurality of side plates constructed to define an anode compartment; and an air-distributing structure formed in the anode compartment. The air-distributing structure has a height difference from the side plates, and the height difference defines an air-distributing path. The metal slurry anode, which is slurry that comprises metal powder, an electrolyte, and a gelling agent, is disposed in the anode compartment. The metal powder can be zinc powder, magnesium powder, aluminum powder or other metal alloy thereof. The air electrode is disposed on the retaining member. The air electrode is generally impervious to aqueous solution but allows gas passage. The separator is disposed between the metal slurry anode and the air electrode for preventing short circuit between the anode and the cathode. The separator is fixedly disposed on the side plates so that the space between the separator and the air-distributing structure defines the air-distributing path.

By using the air-distributing path, the problem of the accumulated gas in the cell unit resulted from the oxidized zinc on the separator can be solved. In other words, the generated gas can be smoothly exhausted from the separator through the air-distributing path. Thus, the preserve-ability of the cell unit may be improved. Furthermore, by using the air-distributing path, the void volume may be reduced so that more metal slurry material can be filled into the anode compartment when forming the metal slurry anode. Thus, the properties, such as the capacity of the cell unit can be improved.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

The present invention provides a retaining member and a metal-air cell unit having the same. The retaining member has a structural height difference to define an air-distributing path or air-distributing space and the generated gas can be released outside through the air-distributing path. The air-distributing path/space can be called as cathode air-distributing path/space because the path/space is kept from the metal slurry anode. In other words, the reacted, expanded anode materials (anode oxide) may not enter in the air-distributing path/space. Therefore, the gas can be exhausted form the separator and the air cathode through the defined air-distributing path/space smoothly. After the cell discharge, the pressure inside the casing will not be increased greatly and thus the problem of electrolyte leakage can be solved.

Figure 1A:
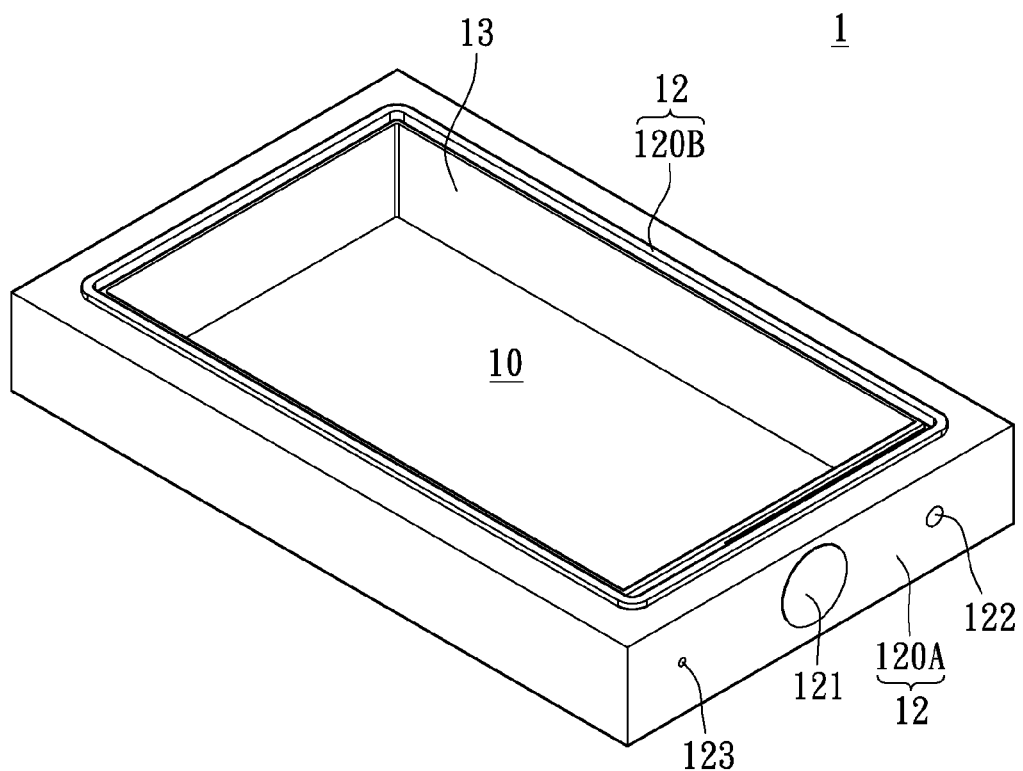
FIG. 1A shows a perspective view of a retaining member applied for a single cell unit of the first embodiment of the instant disclosure.
Figure 1B:
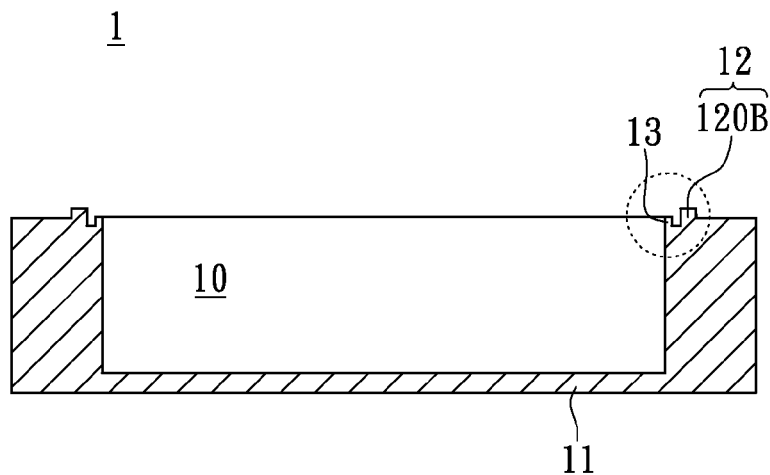
FIG. 1B shows a front view of a retaining member applied for a single cell unit of the first embodiment of the instant disclosure.
Figure 1C:
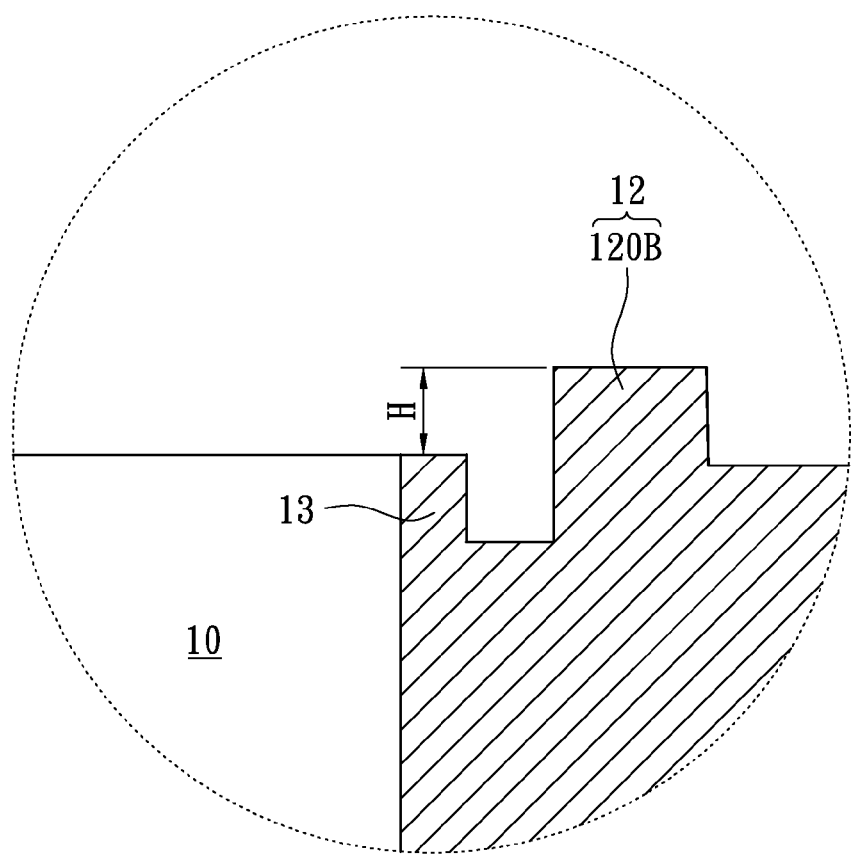
FIG. 1C shows a partially enlarged view of FIG. 1B and shows the height difference between the side plate and the standing wall.

Please refer to FIGS. 1A, 1B and 1C, which show a first exemplary embodiment of a retaining member 1 suitable for adapting in a single cell unit in accordance with the instant disclosure. The retaining member 1 is constructed by an integrated side plate 12 or by a plurality of side plates 12. The constructed side plates 12 are used to define an anode compartment 10. The retaining member 1 of the first exemplary embodiment may be used to assemble a single metal-air cell unit. In other words, the anode compartment 10 is filled of metal slurry anode 7A (7B) to form the single metal-air cell unit.

Figure 7A:
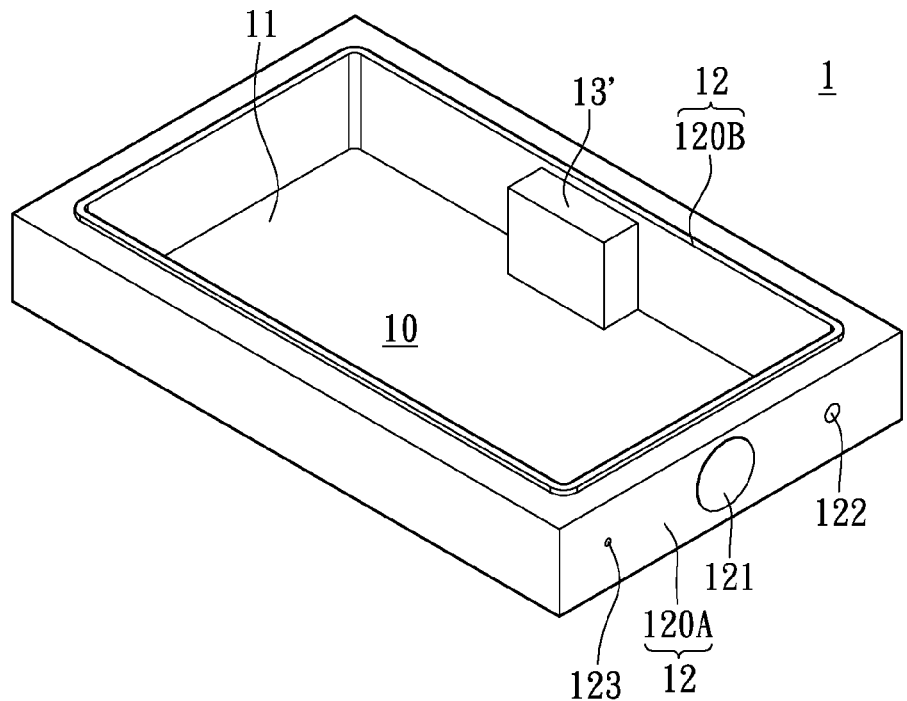
FIG. 7A shows a perspective view of a retaining member having a protruding member of the instant disclosure.

The retaining member 1 further includes an air-distributing structure formed in the anode compartment 10, such as the standing walls 13 in FIG. 1A and the protruding member 13' in FIG. 7A. The air-distributing structure has a height difference "H" from the side plates 12. In this exemplary embodiment, the air-distributing structure has one or more standing walls 13 in proximity of the side plates 12. Alternatively, the air-distributing structure has at least one protruding member 13' in the anode compartment 10. Still alternatively, the air-distributing structure has at least one protruding member 13' and at least one standing wall 13 in the anode compartment 10.

In structural detail, the standing wall(s) 13 is located in the anode compartment 10 and is formed as a frame structure corresponding to the side plates 12. There is a height difference "H" between the standing wall(s) 13 and the side plates 12 and the height difference "H" defines an air-distributing path or air-distributing space. Please refer FIG. 4 first; the generated gas can be exhausted through the separator 2A, 2B and the air electrode 3A, 3B via the defined air-distributing path/air-distributing space.

On the other hand, the retaining member 1 further includes an insertion hole 122 and an anode injecting hole 121 in one of the side plates 12. As shown in FIG. 1A, the side plates 12 are classified into a front plate portion 120A and some side plate portions 120B, and the insertion hole 122 and the anode injecting hole 121 are formed on the front plate portion 120A corresponding to the anode compartment 10. The anode injecting hole 121 is used to fill a metal slurry anode 7A (7B) in the anode compartment 10, for example, the zinc anode (containing zinc powders, an electrolyte (KOH), and a gelling agent) can be injected to fill the anode compartment 10 through the anode injecting hole 121. Moreover, an anode current collector 5A (5B) may be inserted through the insertion hole 122 into the anode compartment 10 to establish contact with the metal slurry anode in the anode compartment 10. In addition, the retaining member 1 further includes at least one auxiliary venting opening 123 defined in one of the side plates 12. As illustrated in FIG. 1A, the auxiliary venting opening 123 is formed on the front plate portion 120A. Furthermore, the auxiliary venting opening 123 may be covered by an air-permeable and hydrophobic membrane (not shown), which can be made by polymeric membranes such as polytetrafluoroethylene (PTFE), to exhaust the generated gas there-through.

Figure 2:
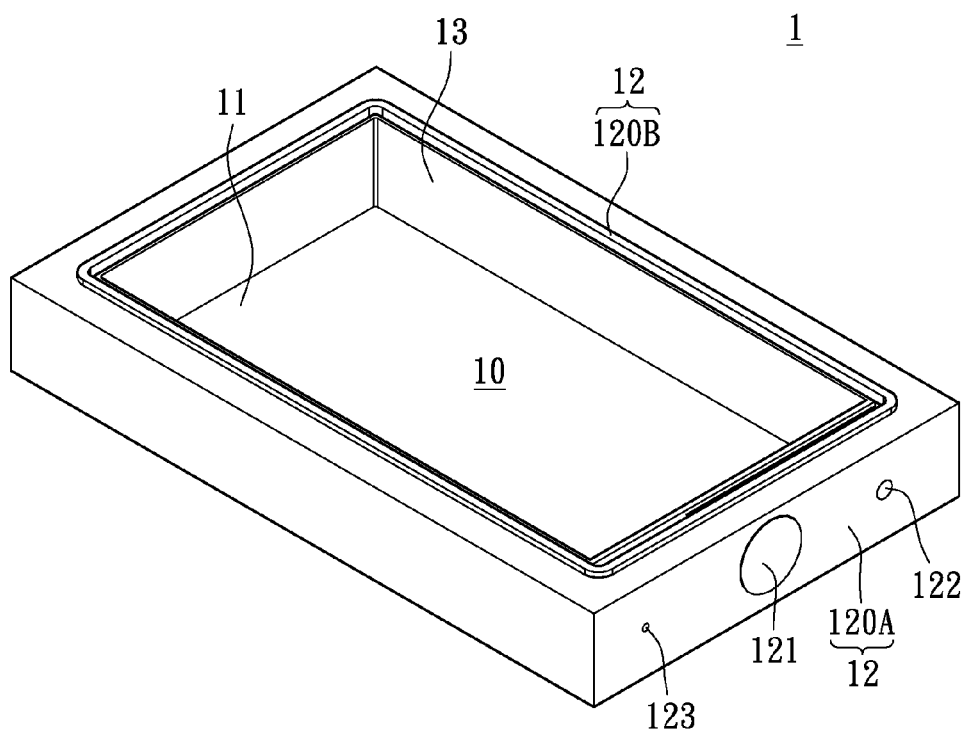
FIG. 2 shows a perspective view of a retaining member applied for a single cell unit of the second embodiment of the instant disclosure.

Please refer to FIG. 2, which illustrates the retaining member 1 in accordance to a second exemplary embodiment of the instant disclosure being utilized in a single cell unit. In the second exemplary embodiment, the retaining member 1 further includes a bottom plate 11 connected to the side plates 12 and the anode compartment 10 is defined by the bottom plate 11 and the side plates 12.

Figure 3:
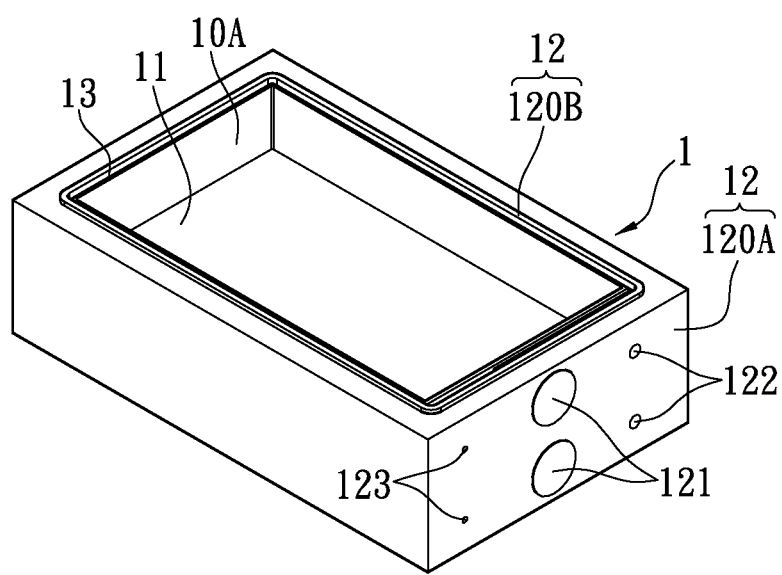
FIG. 3 shows a perspective view of a retaining member applied for a 2-cell unit of the first embodiment of the instant disclosure.

Please refer to FIG. 3, which shows the retaining member 1 of the first exemplary embodiment being utilized in a 2-cell unit. The bottom plate 11 may be located the middle of the side plates 12 so as to define two anode compartments 10 respectively in the upper and bottom positions. On the other hand, the front plate portion 120A of the side plates 12 has a pair of anode injecting holes 121, a pair of insertion holes 122 and a pair of auxiliary venting opening 123 formed thereon corresponding to the two anode compartments 10. Accordingly, the retaining member 1 may be applied to a single cell unit, a 2-cell unit or a multi-cell unit.

Figure 4:
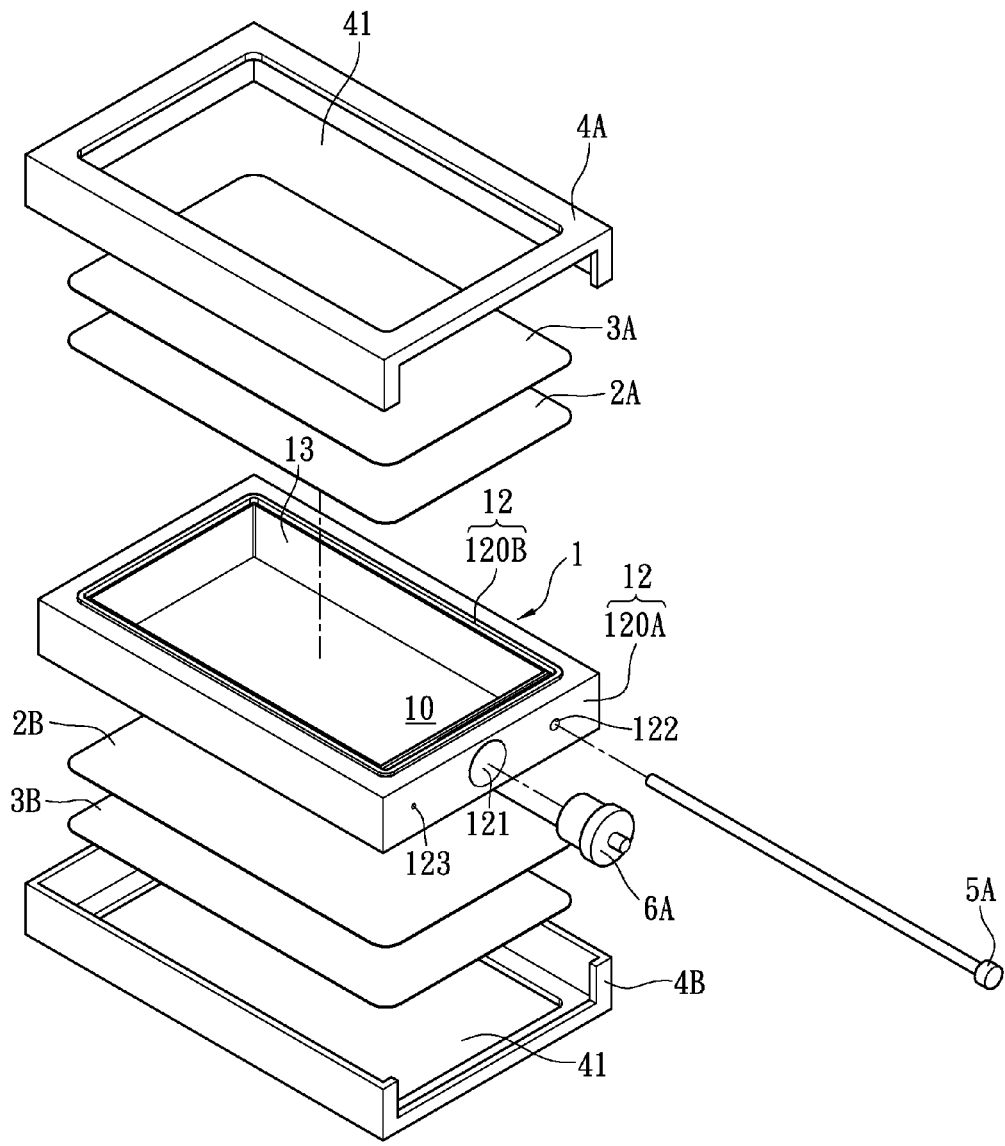
FIG. 4 shows the exploded view of the single cell unit of the first embodiment of the instant disclosure.
Figure 5:
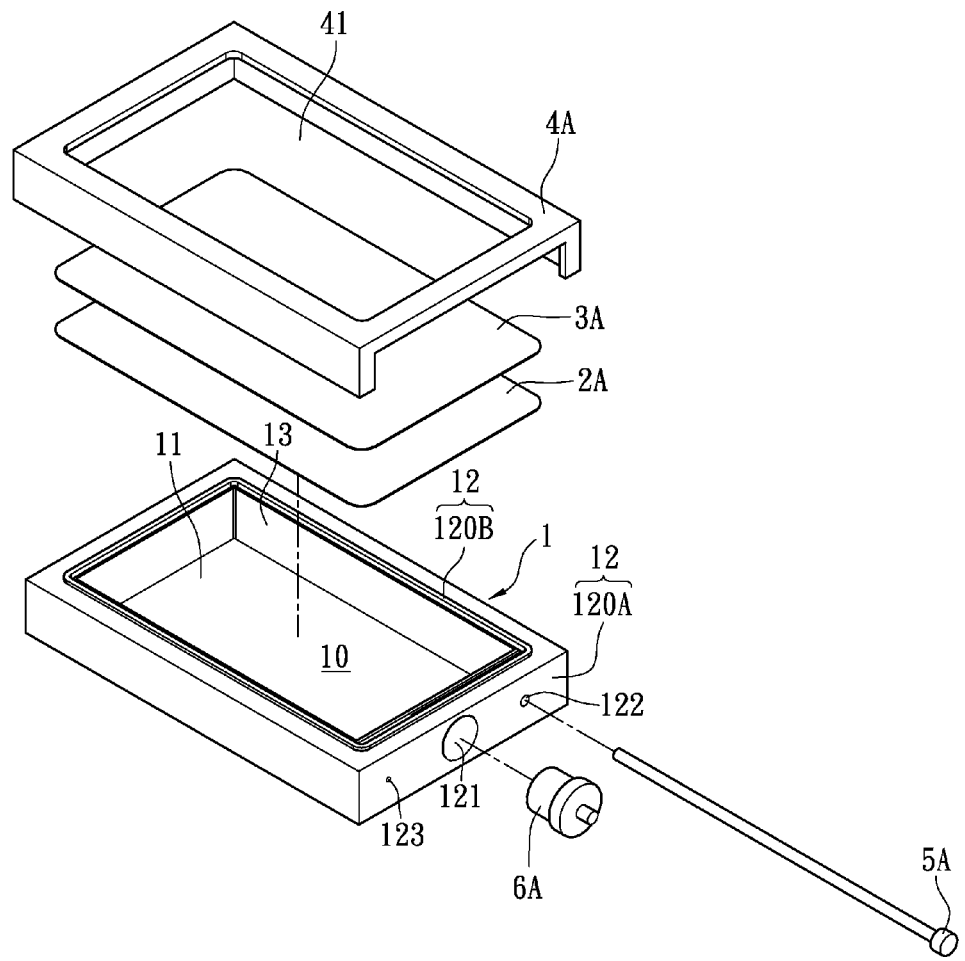
FIG. 5 shows the exploded view of the single cell unit of the second embodiment of the instant disclosure.
Figure 6:
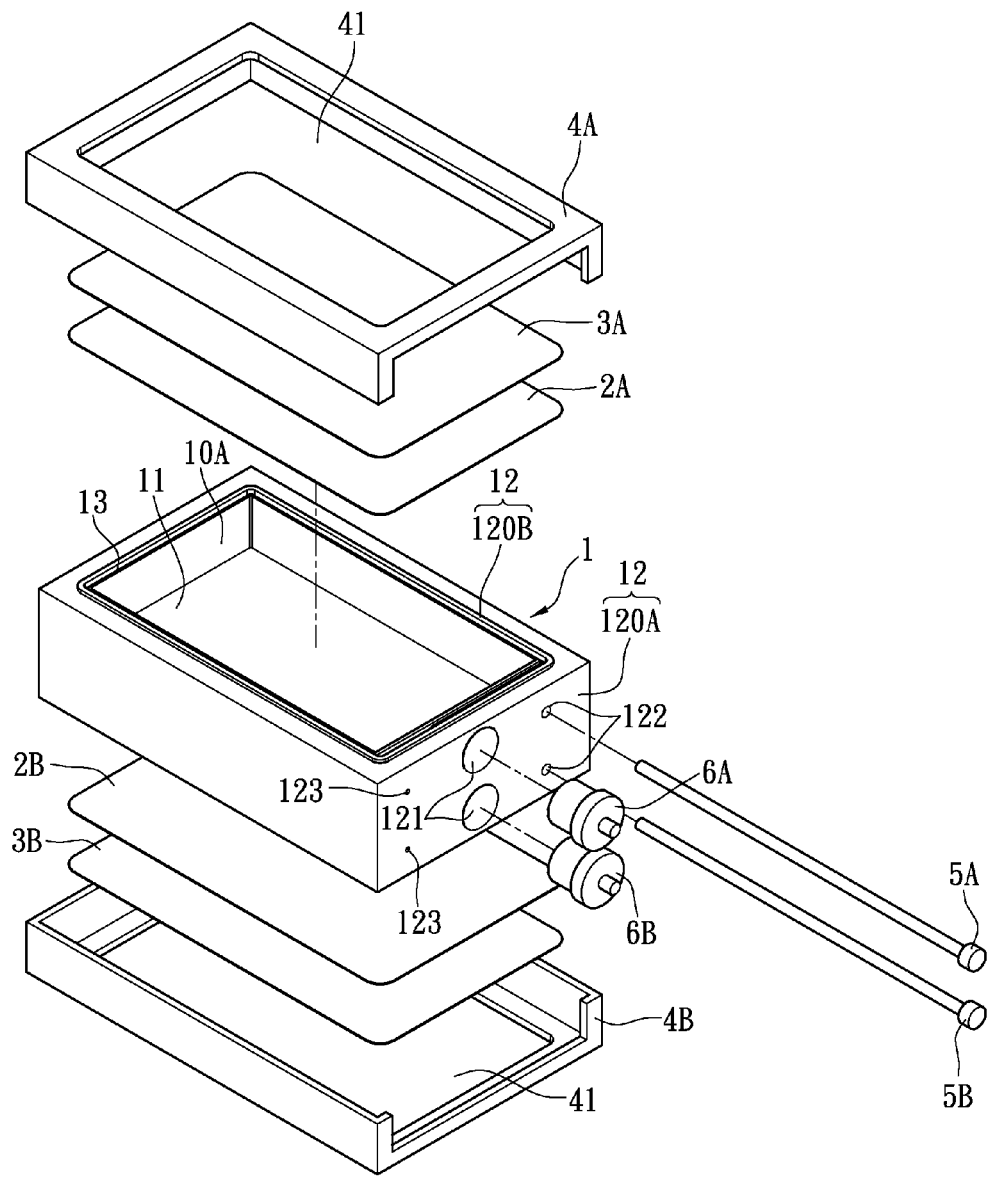
FIG. 6 shows the exploded view of the 2-cell unit of the instant disclosure.

Please refer to FIGS. 4 and 5; two kinds of the single cell unit are shown. The single cell unit shown in FIG. 4 is constructed by the retaining member 1 of FIG. 1A. The single cell unit shown in FIG. 5 is constructed by the retaining member 1 of FIG. 2. FIG. 6 shows the 2-cell unit constructed by the retaining member 1 of FIG. 3. The structures of the single cell unit, 2-cell unit or multi-cell unit are similar in structure and the single cell unit may be referenced to the following 2-cell unit.

Figure 7B:
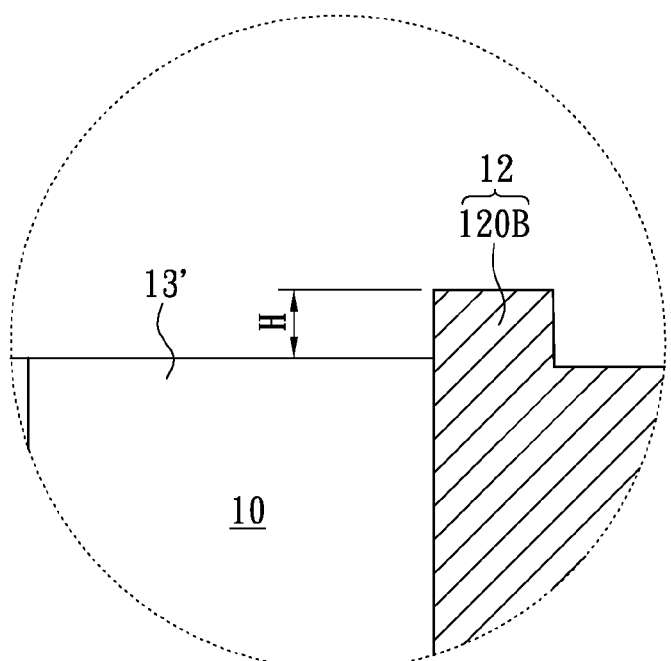
FIG. 7B shows a partially enlarged view of FIG. 7A and shows the height difference between the side plate and the protruding member.

As shown in FIGS. 7A, 7B; an alternative air-distributing structure has at least one protruding member 13', which is formed in the anode compartment 10 and occupies a predetermined area. Similarly, there is a height difference "H" between the protruding member 13' and the side plates 12. In this particular example, however, the protruding member 12 is higher than the side plates 13', and the height difference "H"

defines an air-distributing path or air-distributing space on the anode compartment 10. As the experimental result of Table. 2, the zinc slurry anode cannot be stacked inside the defined air-distributing path/air-distributing space so that the generated gas is smoothly exhausted from the air-distributing path/air-distributing space. Therefore, the undesired electrolyte leakage problem is solved because the inner pressure of the gas is not increasing.

Figure 7C:
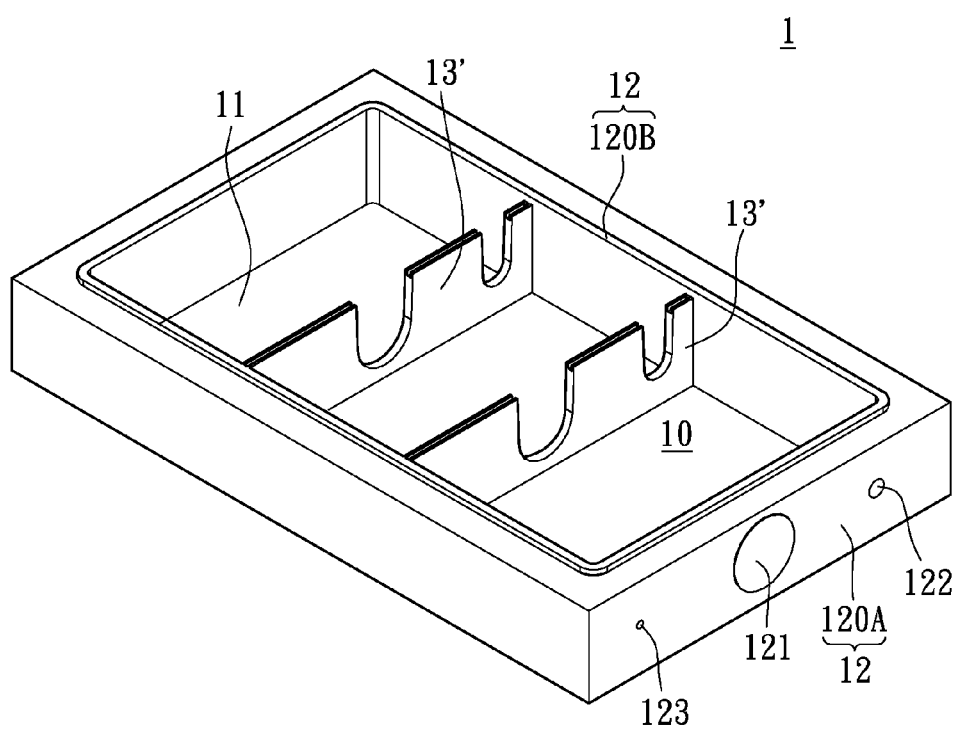
FIG. 7C shows a perspective view of a retaining member having another type of the protruding member of the instant disclosure.
Figure 8A:
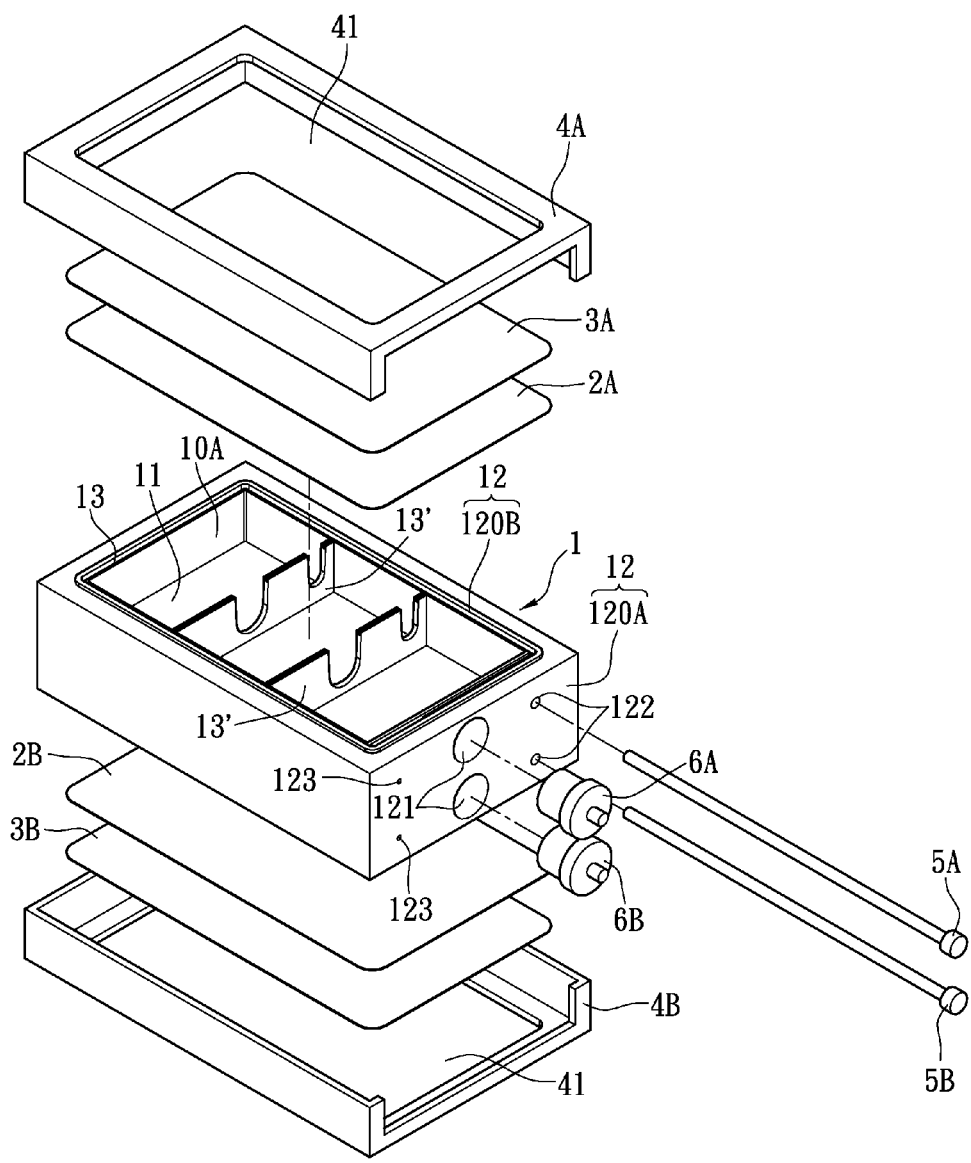
FIG. 8A shows the exploded view of the 2-cell unit of the first embodiment of the instant disclosure.
Figure 8B:
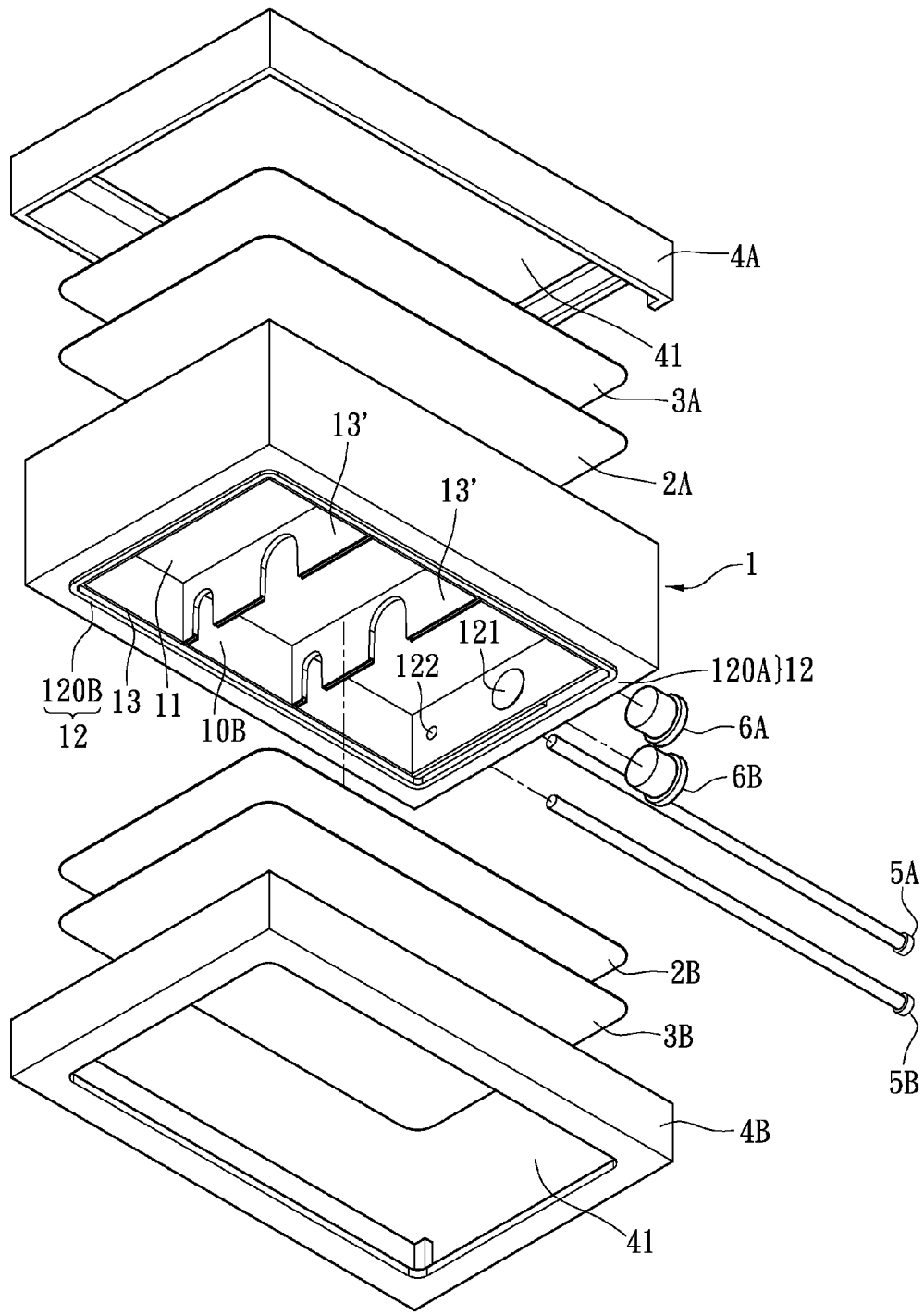
FIG. 8B shows another exploded view of the 2-cell unit of the first embodiment of the instant disclosure.
Figure 8C:
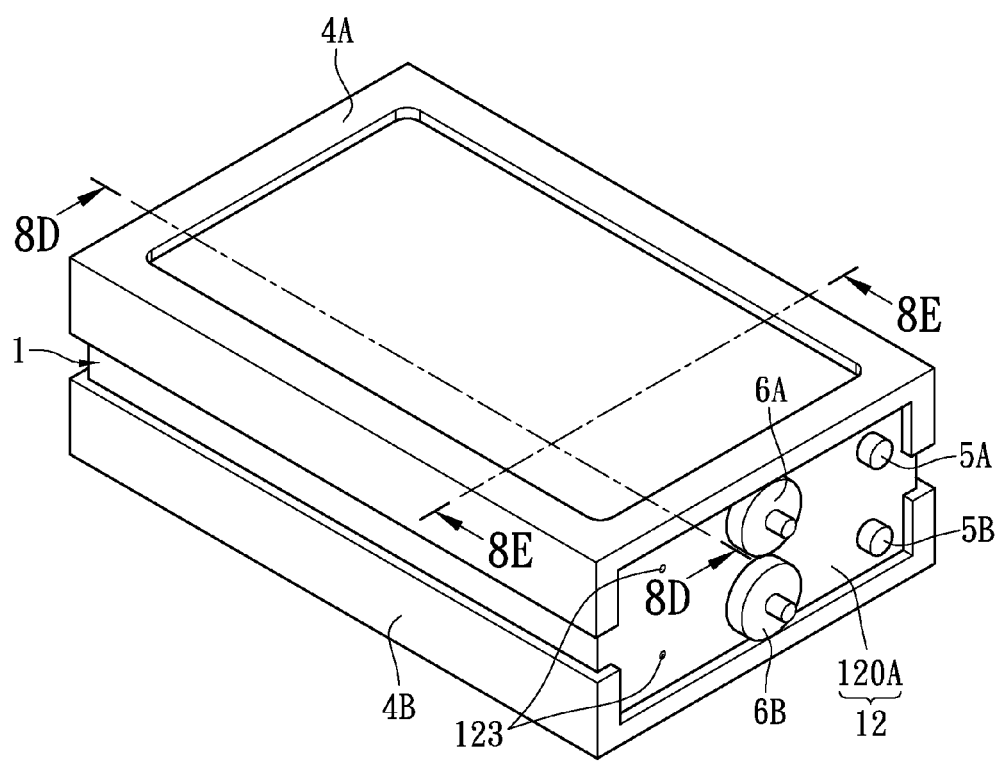
FIG. 8C shows the perspective view of the 2-cell unit of the first embodiment of the instant disclosure.
Figure 8D:
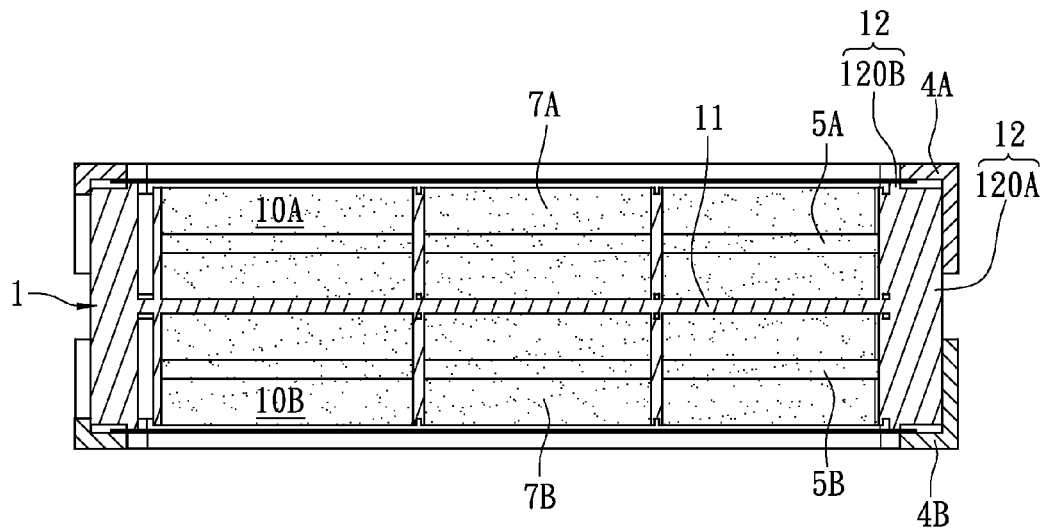
FIG. 8D shows the cutting view on 8D-8D in FIG. 8C according to the instant disclosure.
Figure 8E:
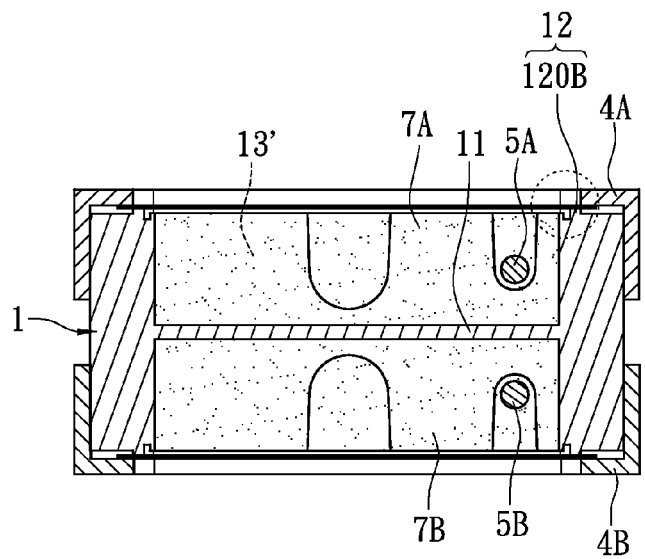
FIG. 8E shows the cutting view on 8E-8E in FIG. 8C according to the instant disclosure.
Figure 8F:
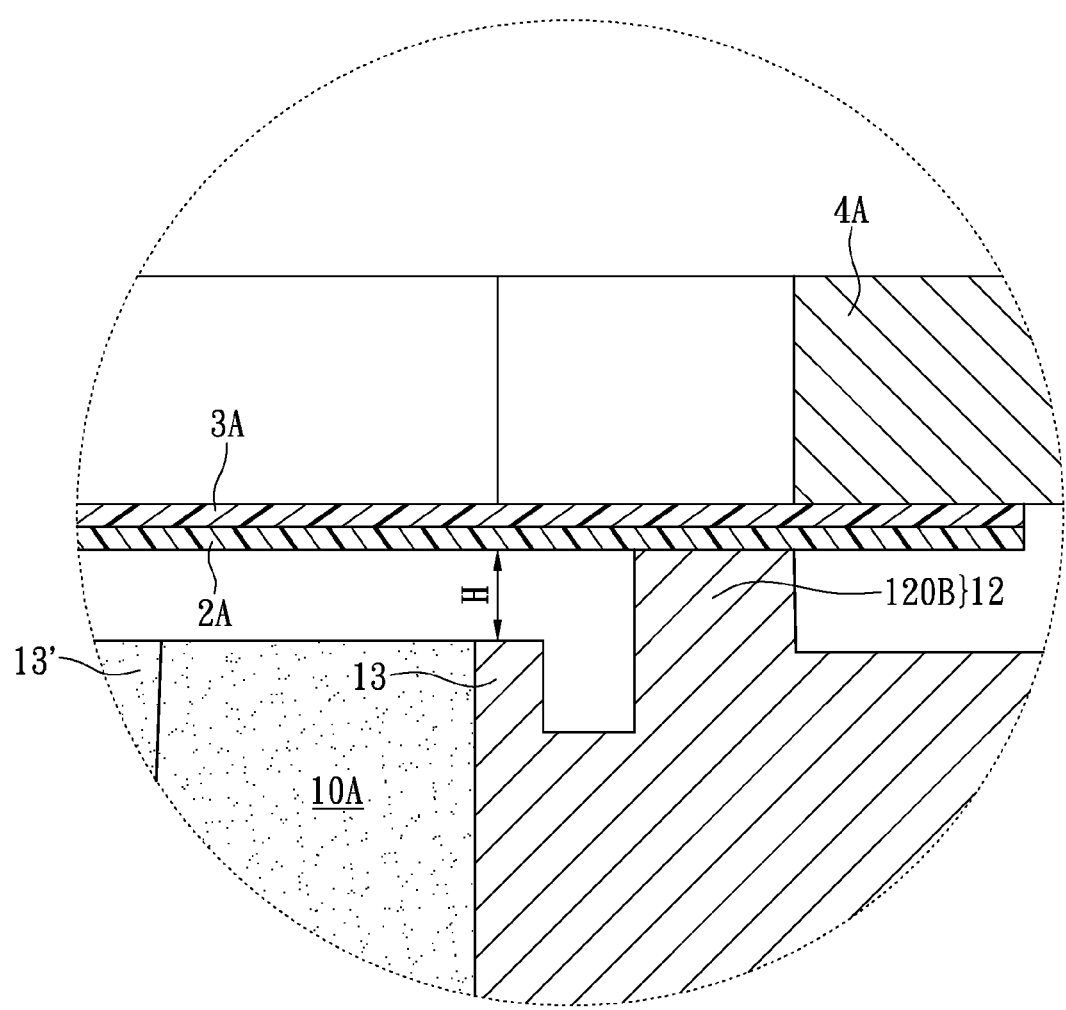
FIG. 8F shows a partially enlarged view of FIG. 8E and shows the height difference between the side plate, the protruding member and the standing wall.

However, the number and the shape of the protruding member 13' are not restricted thereby. The protruding member 13' may be a solid pillar/post; for example, a Circular cylinder or a solid hexagonal post. The protruding member 13' may be an empty pillar/post. In the structural limitation, the protruding member 13' occupies an area and has a height difference "H" from the side plates 12. In an alternative exemplary embodiment shown in FIG. 7C, the protruding member 13' is a plate-shape member which is connected between two corresponding side plate portions 120B. As discussed above, the number and the location of the plate-shape protruding member 13' are not restricted thereby.

Please refer to FIGS. 8A through 8D; the 2-cell metal-air cell unit having the retaining member 1 is shown. The metal-air cell unit at least includes the above-mentioned retaining member 1, two metal slurry materials 7A (7B), two air electrodes 3A (3B) and two separators 2A (2B). Similar with FIG. 3, the bottom plate 11 and the side plates 12 define upper and bottom anode compartments 10A, 10B. The metal slurry anode 7A, the separator 2A and the air electrode 3A are arranged in correspondence to the upper anode compartment 10A. Similarly, the metal slurry anode 7B, the separator 2B and the air electrode 3B are located correspondingly to the bottom anode compartment 10B.

A zinc-air cell unit is taken as an exemplary embodiment. The separators 2A, 2B are fixed on the side plates 12 of the retaining member 1, as shown in FIGS. 8A-8F. The separators 2A, 2B can be made of non-woven fabrics coated by polymer resin, such as PP, PE, mixture of PE/PP, or solid polymer electrolyte, such as PVA or PEO. Due to the height difference "H" from the side plates 12 and the air-distributing structure (i.e., the standing walls 13 and the protruding member 13'), the separators 2A, 2B have a distance "H" from the air-distributing structure to define the air-distributing path/air-distributing space. Then, the air electrodes 3A, 3B are fixed on the retaining member 1 respectively and correspondingly to the separators 2A, 2B. Furthermore, a casing assembly including a top cover 4A and a bottom cover 4B is used to fix the cell unit thereinside. The top cover 4A and the bottom cover 4B may further have venting hole(s) 41 thereon in order to improve the gas flow. On the other hand, the metal slurry anode 7A (7B) including zinc powder about weight ratio of 70%, an electrolyte, such as potassium hydroxide solution of concentration of 34% and binder agent about weight ratio of 0.5%, which acts as the anode electrode of the Zn-air cell. In detail, the zinc-containing slurry material is injected into the upper and bottom anode compartments 10A, 10B through the anode injecting holes 121 to form the metal slurry anode. Then, the sealing members 6A, 6B, such as elastic rubbers, are assembled on and seal the anode injecting holes 121. On the other hand, the anode current collectors 5A, 5B are pin-shaped and respectively placed in the upper and bottom anode compartments 10A, 10B by inserting through the insertion holes 122 to collect and conduct the electrical current.

The experimental results of the Zn-air cell unit having the retaining member 1 are shown below.

Please refer to Table. 1; the influence of the zinc anode to the air-distributing path/air-distributing space in different value of "H." In this experiment, ten (10) grams zinc anode (70 wt %) is filled into the upper and bottom anode compartments 10A, 10B and the zinc anode occupies 90% of the anode volume (i.e., the volume of the anode compartments 10A or 10B). The assembled cell unit is subjected to oscillation along three axes and exhibits a simple harmonic motion (SHM). The condition of SHM is mentioned below. Amplitude of vibration: 0.8 millimeter; Maximum amplitude of vibration: 1.6 millimeter; Frequency variation: 1 Hz/min; Frequency range: 10 Hz-50 Hz; Reciprocal vibration time in each axis: 90 minutes. The tested cell unit is disassembled to observe the zinc anode is residual in the air-distributing path/air-distributing space or not. Furthermore, the experimental results also show that the air-distributing path/air-distributing space is filled with the zinc anode or not.

As shown in Table. 1; when the height difference "H" is less than 0.6 millimeter, even after the vibration test, the zinc anode does not permeate through the air-distributing path/air-distributing space, the air-distributing path/air-distributing space therefore will not be filled by the zinc anode. On the other hand, in the condition that the height difference "H" is about 1.0 millimeter, although some tested cell units experience zinc anode residuals in the air-distributing path/air-distributing space, few tested cell unit has the air-distributing path/air-distributing space filled by the zinc anode. In conclusion, when the height difference "H" is ranged from 0.1 to 1.0 millimeter, the air-distributing path/air-distributing space can not be filled by the zinc anode, so that the generated gas can be exhausted smoothly through the air-distributing path/air-distributing space defined by the height difference "H". In other words, the air-distributing path/air-distributing space created in the present invention can be applied to solve the gas accumulation problem resulted from the generated zinc oxide on the separator. When taking into consideration the residual zinc anode and the gas-exhaustion efficiency, the preferred height difference "H" ranges from 0.3 to 0.6 millimeter. More preferably, the height difference "H" ranges from 0.4 to 0.5 millimeter.

TABLE 1

| H (mm) | residual zinc anode | filled of the zinc anode |
| --- | --- | --- |
| 0.1 | N(0/50) | N(0/50) |
| 0.2 | N(0/50) | N(0/50) |
| 0.3 | N(0/50) | N(0/50) |
| 0.4 | N(0/50) | N(0/50) |
| 0.5 | N(0/50) | N(0/50) |
| 0.6 | N(1/50) | N(0/50) |
| 0.7 | N(3/50) | N(0/50) |
| 0.8 | Y(8/50) | N(0/50) |
| 0.9 | Y(10/50) | N(1/50) |
| 1.0 | Y(10/50) | N(3/50) |
| 1.1 | Y(40/50) | Y(30/50) |
| 1.2 | Y(50/50) | Y(40/50) |

Note:
Each condition has 50 cell units to observe:
1. "N" represents that 10% or less of the 50 cell units have no residual zinc anode in the air-distributing path/air-distributing space.
2. "Y" represents that 10% or more of the 50 cell units are filled with zinc anode in the air-distributing path/air-distributing space.

Please refer to Table. 2, which shows the ratio of the zinc anode filling in the anode compartment and the preservation time in different air-distributing manners. For this experiment, zinc anode (70 wt. %) of density 3.00 g/cm$^3$ was filled into anode compartments of different retaining members having different air-distributing arrangements, and occupies different ratio of the anode volume. Specifically, for cell types #5 and #6, the height difference H is set at a range from 0.4 to 0.5 millimeter. In addition, for cell type #5 (having a structural configuration as shown in FIGS. 7A/7B), the ratio of the air distributing space to the volume of the anode compartment is 5%. For cell type #6 (whose structural configuration is shown in FIGS. 1B/1C), the ratio of air distributing space to the volume of the anode compartment is 1%. The assembled cell units were preserved at 70° C. and the date of electrolyte leakage is recorded.

As the experimental results shown in Table. 2, without the air-distributing space, the preservation time of the cell units at 70° C. is decreased when the ratio of zinc anode filling in the anode compartment increases from 70% to 90%. Without the air-distributing space, the inner pressure increases because the generated zinc oxide blocks the air distributing so that the electrolyte leakage occurs. On the contrary, by using the air-distributing space defined by the height difference "H", the preservation time of the cell units at 70° C. is more than the preservation time of the cell units without the air-distributing space. For example, by using the air-distributing space defined by the height difference "H" between the standing wall(s) 13 and the side plates 12 (as shown in FIGS. 1B, 1C), the preservation time of the cell units at 70° C. is about 55 day(s) even when the ratio of zinc anode filling in the anode compartment is about 90%. Taking another example, by using the air-distributing space defined by the height difference "H" between the protruding member 13' and the side plates 12 (as shown in FIGS. 7A, 7B), the preservation time of the cell units at 70° C. is about 50 day(s) even when the ratio of zinc anode filling in the anode compartment is about 90%.

TABLE 2

| Type of the air-distributing space | The day of occurring of electrolyte leakage | Filling ratio of zinc anode (%) |
|---|---|---|
| (#1) none | 30 day | 70 |
| (#2) none | 20 day | 75 |
| (#3) none | 14 day | 80 |
| (#4) none | 3 day | 90 |
| (#5) cathode air-distributing space defined by the air-distributing structure of FIGS. 7A, 7B | 50 day | 90 |
| (#6) cathode air-distributing space defined by the air-distributing structure of FIGS. 1B, 1C | 55 day | 90 |

Note:
1. Filling ratio of zinc anode = (the volume of the zinc anode)/(the volume of the anode compartment (minus) the volume of the air-distributing space) × 100%.
2. For condition listed above, 40 cell units were observed; if the ratio of the cell units having electrolyte leakage is more than 1%, the condition of electrolyte leakage is determined.

On the other hand, the maximum filling ratio of zinc anode is increasing in the same preservation time of the cell units (i.e., 30 days at 70° C.) by using the air-distributing space of the present invention. Please refer to the experimental results of Table. 3; the filling ratio and the practically filling ratio of zinc anode in different volume of the air-distributing space are shown. As the shown data, when the ratio of the air-distributing space (i.e., the ratio between the air-distributing space and the anode compartment) is less than 20%, the practical filling ratio of zinc anode is higher than the filling ratio of zinc contained slurry in the cell unit without the air-distributing space. The area occupied by the air-distributing structure can be used to calculate the ratio of the air-distributing space in order to define the ratio between the air-distributing space and the anode compartment being less than 20%.

TABLE 3

| Ratio of the air-distributing space (%) | Filling ratio of zinc anode (%) | Practical filling ratio of zinc anode (%) |
|---|---|---|
| 0 | 70 | 70.00 |
| 1 | 90 | 89.10 |
| 5 | 90 | 85.50 |
| 10 | 90 | 81.00 |
| 20 | 90 | 72.00 |
| 30 | 90 | 63.00 |

Note:
1. The ratio of the air-distributing space = (the volume of the air-distributing space)/(the volume of the anode compartment) × 100%.
2. The filling ratio of zinc anode = (the volume of the filled zinc anode)/(the volume of the anode compartment − the volume of the air-distributing space) × 100%.
3. The practical filling ratio of zinc anode = (the volume of the filled zinc anode)/(the volume of the anode compartment) × 100%.

Please refer to Table. 4A and 4B; the volume of the anode material expends during cell discharging because of the larger volume of the zinc oxide. In the experimental embodiment, the zinc anode (70 wt %) having density of 3.00 g/cm$^3$ is filled into the anode compartment of the retaining member 1 shown in FIG. 8A with different filling ratios to assemble with the separator and air electrode to form the cell units. The assemble cell units are preserved at 70° C. in two days and then are discharged in discharge current of 500 mA. The cut-off voltage is 800 mV. The volumes of the expanded anodes of the discharged cell units are calculated and shown in Table. 4A and 4B. When the filling ratio of the zinc anode is higher than 95%, the electrolyte leakage will occur at short notice. On the other hand, when the filling ratio of the zinc anode is too low (for example, lower than 75%), the capacity of the cell unit may not meet the requirement of applications. therefore, the preferable filling ratio of the zinc anode in the present invention may be ranged from 77% to 93%. Moreover, after the discharge, the ratio of the void volume is less than 6% to achieve both the smooth gas-exhaustion and capacity of the cell unit.

TABLE 4A

| Volume of anode compartment (cm$^3$) | Volume of air-distributing space (cm$^3$) | Filling ratio of zinc anode (%) | Filling volume of zinc anode (cm$^3$) | Discharge capacity (mAh) |
|---|---|---|---|---|
| 5.70 | 0.057 | 70 | 3.95 | 4421 |
| 5.70 | 0.057 | 75 | 4.23 | 5102 |
| 5.70 | 0.057 | 80 | 4.51 | 5830 |
| 5.70 | 0.057 | 85 | 4.80 | 6608 |
| 5.70 | 0.057 | 90 | 5.08 | 6559 |
| 5.70 | 0.057 | 95 | 5.36 | 6277 |

TABLE 4B

| Volume of anode compartment (cm$^3$) | Volume of air-distributing space (cm$^3$) | Ratio of expanded volume of zinc anode (%) | expanded volume of zinc anode (cm$^3$) | Ratio of the void volume (%) |
|---|---|---|---|---|
| 5.70 | 0.057 | 87 | 4.91 | 0.13 |
| 5.70 | 0.057 | 92 | 5.19 | 0.08 |
| 5.70 | 0.057 | 97 | 5.47 | 0.03 |
| 5.70 | 0.057 | 102 | 5.76 | −0.02 |
| 5.70 | 0.057 | 107 | 6.04 | −0.07 |
| 5.70 | 0.057 | 112 | 6.32 | −0.12 |

According to the experimental results, the oxidized zinc may be not deposed on the separator to block the gas exhaustion. Therefore, the gas exhaustion is smoother due to the air-distributing space and the cell unit can be preserved in more time. Moreover, the ratio of the void volume can be reduced by using the air-distributing space so that more zinc anode can be filled into the anode compartment and the discharge capacity of the cell unit can be increased.

To clarify the choice of element naming/terminology, please note that, the air-distributing structure recited in the instant disclosure (as shown by the standing wall 13 in FIG. 1A or the protruding member 13' in FIG. 7A) is a physical structure, thus does not possess active ability to evacuate gas. However, the term of air-distributing structure refers to the fact that the height difference "H" defined by the air-distributing structure and the side plates 12 can passively allow the generated gas to pass through. Therefore, the structure is named the air-distributing structure accordingly.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:
1. A metal-air cell unit comprising:
    a retaining member, including:
        a plurality of side plates constructed to define an anode compartment; and
        an air-distributing structure arranged in the anode compartment;
        wherein the air-distributing structure has a standing wall and at least one protruding member arranged in the anode compartment; and
        wherein each side plate has an inner surface, a top surface, and an outer surface;
        wherein the standing wall is annularly arranged on the inner surfaces of the side plates;
    a metal slurry anode disposed in the anode compartment, which is an anode of the metal-air cell unit;
    an air electrode disposed on the retaining member corresponding to the metal slurry anode, which is a cathode of the metal-air unit; and
    a separator disposed between the metal slurry anode and the air electrode, wherein the separator is fixedly disposed on the top surfaces of the side plates;
    wherein the side plates are arranged above the air-distributing structure, and wherein a height difference from the top surfaces of the side plates to the air-distributing structure defines an air-distributing path to exhaust and distribute gas.
2. The metal-air cell unit as claimed in claim 1, wherein the retaining member further comprises a bottom plate connected to the side plates, wherein the anode compartment is defined by the bottom plate and side plates.
3. The metal-air cell unit as claimed in claim 1, wherein the standing wall of the air-distributing structure and the side plates occupy a predetermined area so that a ratio between a volume of the air-distributing path and a volume of the anode compartment is less than 20%.
4. The metal-air cell unit as claimed in claim 1, wherein the protruding member of the air-distributing structure and the side plates occupy a predetermined area so that a ratio between a volume of the air-distributing path and a volume of the anode compartment is less than 20%.
5. The metal-air cell unit as claimed in claim 1, wherein the side plates, the protruding member, and the standing wall of the air-distributing structure occupy a predetermined area so that a ratio between a volume of the air-distributing path and a volume of the anode compartment is less than 20%.
6. The metal-air cell unit as claimed in claim 1, wherein the height difference is ranged from 0.1 millimeter to 1.0 millimeter.
7. The metal-air cell unit as claimed in claim 6, wherein the height difference is ranged from 0.3 millimeter to 0.6 millimeter.
8. The metal-air cell unit as claimed in claim 1, further comprising an anode current collector, wherein one of the side plates has an insertion hole corresponding to the anode compartment, and the anode current collector is inserted into the anode compartment through the insertion hole.
9. The metal-air cell unit as claimed in claim 1, further comprising a sealing member, wherein one of the side plates has an anode injecting hole corresponding to the anode compartment, the metal slurry anode is injected into the anode compartment through the anode injecting hole, and the sealing member is assembled on the anode injecting hole.
10. The metal-air cell unit as claimed in claim 1, further comprising a casing assembly.
11. The metal-air cell unit as claimed in claim 10, further comprising at least one auxiliary venting opening arranged on one of the side plates.
12. The metal-air cell unit as claimed in claim 11, wherein the auxiliary venting opening is defined on the same side plate having the anode injecting hole, wherein the auxiliary venting opening is covered by an air-permeable and hydrophobic membrane.
13. A metal-air cell unit comprising:
    a retaining member, including:
        a plurality of side plates constructed to define an anode compartment; and
        an air-distributing structure arranged in the anode compartment;
        wherein the air-distributing structure has a standing wall and at least one protruding member arranged in the anode compartment;
        wherein each side plate has an inner surface, a top surface, and an outer surface;
    a metal slurry anode disposed in the anode compartment, which is an anode of the metal-air cell unit;
    an air electrode disposed on the retaining member corresponding to the metal slurry anode, which is a cathode of the metal-air unit; and
    a separator disposed between the metal slurry anode and the air electrode, wherein the separator is fixedly disposed on the top surfaces of the side plates;
    wherein the side plates are arranged above the air-distributing structure, and wherein a height difference from the top surfaces of the side plates to the air-distributing structure defines an air-distributing path to exhaust and distribute gas.
14. The metal-air cell unit as claimed in claim 13, wherein the retaining member further comprises a bottom plate connected to the side plates, wherein the anode compartment is defined by the bottom plate and side plates.
15. The metal-air cell unit as claimed in claim 13, wherein the standing wall of the air-distributing structure and the side plates occupy a predetermined area so that a ratio between a volume of the air-distributing path and a volume of the anode compartment is less than 20%.
16. The metal-air cell unit as claimed in claim 13, wherein the protruding member of the air-distributing structure and the side plates occupy a predetermined area so that a ratio between a volume of the air-distributing path and a volume of the anode compartment is less than 20%.

17. The metal-air cell unit as claimed in claim 13, wherein the side plates, the protruding member, and the standing wall of the air-distributing structure occupy a predetermined area so that a ratio between a volume of the air-distributing path and a volume of the anode compartment is less than 20%.

18. The metal-air cell unit as claimed in claim 13, wherein the height difference is ranged from 0.1 millimeter to 1.0 millimeter.

19. The metal-air cell unit as claimed in claim 18, wherein the height difference is ranged from 0.3 millimeter to 0.6 millimeter.

20. The metal-air cell unit as claimed in claim 13, further comprising an anode current collector, wherein one of the side plates has an insertion hole corresponding to the anode compartment, and the anode current collector is inserted into the anode compartment through the insertion hole.

21. The metal-air cell unit as claimed in claim 13, further comprising a sealing member, wherein one of the side plates has an anode injecting hole corresponding to the anode compartment, the metal slurry anode is injected into the anode compartment through the anode injecting hole, and the sealing member is assembled on the anode injecting hole.

22. The metal-air cell unit as claimed in claim 13, further comprising a casing assembly.

23. The metal-air cell unit as claimed in claim 22, further comprising at least one auxiliary venting opening arranged on one of the side plates.

24. The metal-air cell unit as claimed in claim 23, wherein the auxiliary venting opening is defined on the same side plate having the anode injecting hole, wherein the auxiliary venting opening is covered by an air-permeable and hydrophobic membrane.

* * * * *

UNITED STATES PATENT AND TRADEMARK OFFICE
CERTIFICATE OF CORRECTION

PATENT NO.       : 9,023,539 B2  
APPLICATION NO.  : 13/620792  
DATED            : May 5, 2015  
INVENTOR(S)      : Kuei-Yung Chen Wang Page 1 of 1

It is certified that error appears in the above-identified patent and that said Letters Patent is hereby corrected as shown below:

Title Page, should read,

(73)    Assignee:  HIGH TECH BATTERY INCORPORATION, Taipei (TW)

Signed and Sealed this  
Nineteenth Day of January, 2016

Michelle K. Lee  
*Director of the United States Patent and Trademark Office*